(12) United States Patent
Polehn (10) Patent No.: US 8,862,112 B2
(45) Date of Patent: Oct. 14, 2014

(54) ULTRA-THIN MOBILE CLIENT

(71) Applicant: Cellco Partnership, Basking Bridge, NJ (US)

(72) Inventor: Donna L. Polehn, Kirkland, WA (US)

(73) Assignee: Cellco Partnership, Basking Ridge, NJ (US)

( * ) Notice: Subject to any disclaimer, the term of this patent is extended or adjusted under 35 U.S.C. 154(b) by 6 days.

(21) Appl. No.: 13/658,915

(22) Filed: Oct. 24, 2012

(65) Prior Publication Data

US 2014/0113682 A1    Apr. 24, 2014

(51) Int. Cl.
*H04M 3/00*    (2006.01)

(52) U.S. Cl.
USPC .......................................... 455/418; 455/419

(58) Field of Classification Search
None
See application file for complete search history.

(56) References Cited

U.S. PATENT DOCUMENTS

| | | | | |
|---|---|---|---|---|
| 8,060,074 B2 * | 11/2011 | Danford et al. | ................ | 455/419 |
| 8,335,539 B1 * | 12/2012 | Wu | ................................ | 455/557 |
| 8,438,256 B2 * | 5/2013 | Rogel et al. | .................... | 709/223 |
| 2004/0076236 A1 * | 4/2004 | Duruoz et al. | ............ | 375/240.25 |
| 2007/0179993 A1 * | 8/2007 | Arruza | ........................... | 707/202 |
| 2009/0036111 A1 * | 2/2009 | Danford et al. | ................ | 455/419 |
| 2009/0131035 A1 * | 5/2009 | Aiglstorfer | .................... | 455/419 |
| 2011/0090786 A1 * | 4/2011 | Liu et al. | ........................ | 370/221 |
| 2011/0161404 A1 * | 6/2011 | Ekstrom et al. | ................ | 709/203 |
| 2013/0324099 A1 * | 12/2013 | Dgani et al. | .................. | 455/418 |

* cited by examiner

*Primary Examiner* — Magdi Elhag (57) ABSTRACT

A mobile device includes a communication interface configured to receive, over a wireless communication link, output data from a server device via a wireless network, and send, over the wireless communication link, input data to the server device via the wireless network. The mobile device also includes a display for displaying a first portion of the output data, a speaker for providing sounds corresponding to a second portion of the output data, a human interface component for receiving input data to the mobile device, and a hardware component. The hardware component provides the output data to the display and the speaker, and provides the input data to the server device. The hardware component does not include any processor that runs an operating system or an application for the mobile device.

18 Claims, 9 Drawing Sheets

ULTRA-THIN MOBILE CLIENT

BACKGROUND

Mobile devices, such as smart phones and tablets, are becoming more technically advanced, providing features such as faster processing, more memory, and improved screen resolution. However, these features can make mobile devices costly to purchase or repair.

DETAILED DESCRIPTION OF PREFERRED EMBODIMENTS

The following detailed description refers to the accompanying drawings. The same reference numbers in different drawings may identify the same or similar elements.

The predominant model for mobile devices employs "fat" handsets (e.g., user devices) where a central processing unit (CPU), operating system (OS), software, etc. all reside locally on the mobile device. Systems and/or methods described herein may provide a thin client mobile device that eliminates the use of a local OS and application software, instead providing a simplified hardware-based mobile device. Intelligence for the thin client mobile device may be provided from a remote server device via a wireless access network using a streamlined communication protocol, referred to herein as Ultra-Thin Client Protocol (UTCP).

In one implementation, the mobile device may include a communication interface configured to receive, over a wireless communication link, output data from a server device via a wireless network, and to send, over the wireless communication link, input data to the server device via the wireless network. The mobile device may also include a display for displaying a first portion of the output data, a speaker for providing sounds corresponding to a second portion of the output data, a human interface component for receiving input data to the mobile device, and a hardware component. The hardware component provides the output data to the display and the speaker, and provides the input data to the server device. The hardware component may not include any processor that runs an operating system or an application for the mobile device.

Figure 1:
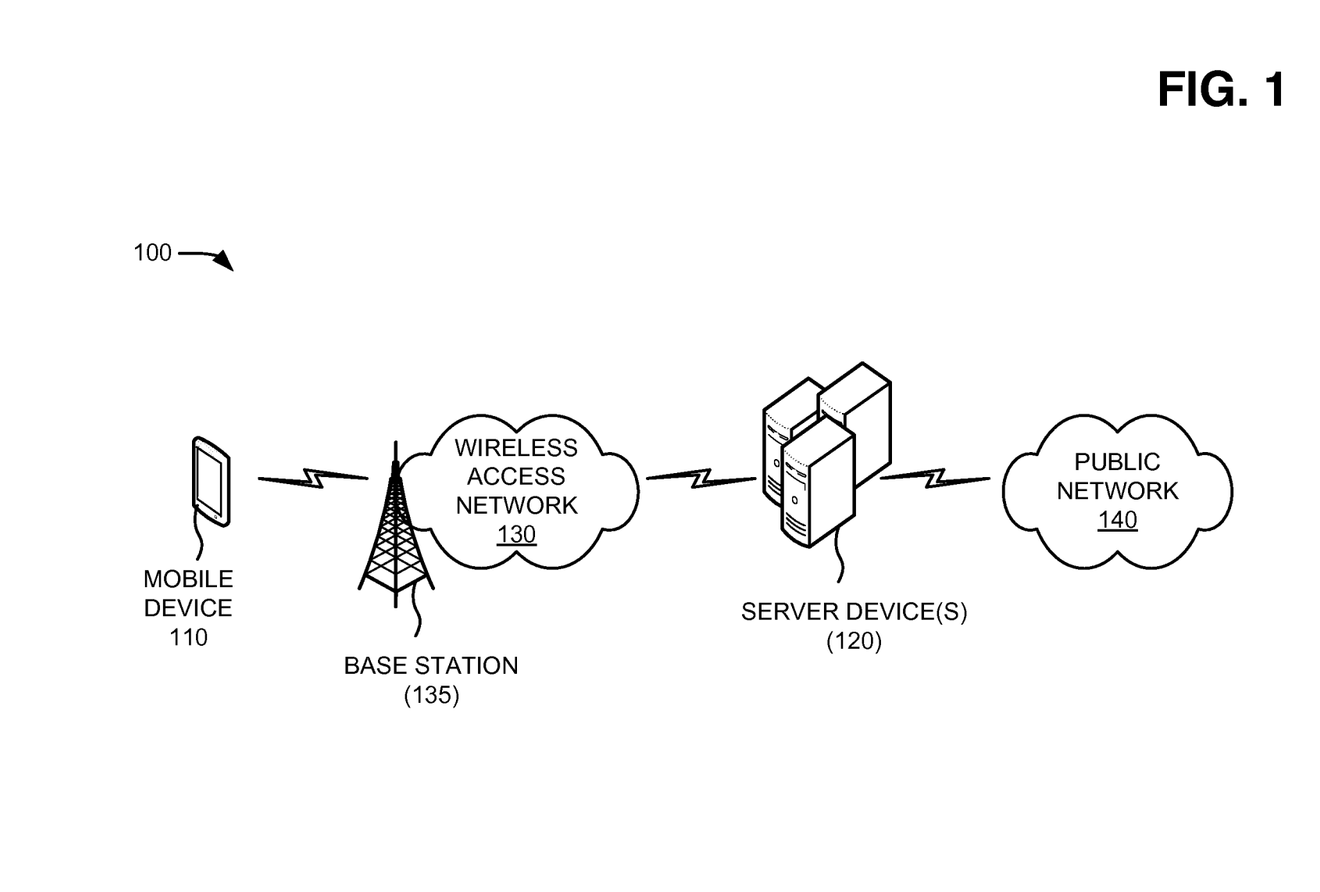
FIG. 1 depicts an exemplary network in which systems and/or methods described herein may be implemented.

FIG. 1 is an exemplary network 100 in which systems and/or methods described herein may be implemented. As illustrated, network 100 may include a mobile device 110, a server device 120, a wireless access network 130, and a public network 140. Components of network 100 may be connected via wired and/or wireless links.

Mobile device 110 may be capable of communicating over a wireless access network (e.g., wireless access network 130). In one implementation, mobile device 110 may include multiple coordinated sequential machines operating on hardware (e.g., an ASIC or FPGA) in place of a conventional central processing unit (CPU) with an operating system. The sequential machines may perform simple tasks repeatedly, but are not programmable in the same manner that, for example, a microprocessor may be. As described further herein, mobile device 110 may provide a human interface to receive user input and send user input to server device 120. Mobile device 110 may also receive screen data and other information from server device 120 to present to a user. Mobile device 110 may provide an interface to one of multiple wireless networks including, for example, a wireless personal area network (e.g., Bluetooth™ protocol), a wireless local area network (e.g., WiFi), or a cellular network (e.g., 4G/LTE). In other implementation, mobile device may include a personal digital assistant (PDA), a radiotelephone, a laptop computer, a gaming console, an e-reader device, a media player, or other types of computation or communication devices with conventional processors.

Server device 120 may include one or more network devices, or other types of computation or communication devices (e.g., an application server device, a personal computer, a laptop computer, etc.), to support applications and services requested via mobile client 110. For example, server device 120 may include a virtual mobile device to emulate presentations on mobile device 110. Server device 120 may also include applications and storage that may be used by the virtual mobile device. In one implementation, server device 120 may be included with other server devices in a distributed network, sometimes referred to as a cloud. Services available in the distributed network can be accessed from different access points and/or devices connected to the distributed network.

Wireless access network 130 may include a wireless communications network that connects subscribers (e.g., mobile device 110) to a service provider (e.g., server device 120). In one example, access network 130 may include a long-term evolution (LTE) network, a WiFi network (e.g., using IEEE 802.11 standards) or other access networks (e.g., an E-UTRAN, an enhanced high-rate packet data (eHRPD) network, or another 3G, 4G, or future access network). In another example, access network 130 may include a radio access network capable of supporting high data rate, low latency, packet optimization, large capacity and coverage, etc.

Wireless access network 130 may include a base station 135. Base station 135 may include one or more devices that receive voice and/or data from server device 120 and transmit that voice and/or data to mobile device 110 via an air interface. Base station 135 may also include one or more devices that receive voice and/or data from mobile device 110 over an air interface and transmit that voice and/or data to server device 120.

Public network 140 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, a fiber-optics network (e.g., passive optical networks (PONS)), an ad hoc network, or another type of network. In an exemplary implementation, public network 140 may include a combination of networks and other components (e.g., switches, routers, etc.) for transmitting data to and from server device 120. For example, server device 120 may connect to public network 140 to allow mobile device 110 to communicate with services providers and/or other devices. In exemplary implementations, public network 140 may provide access to a service provider that facilitates voice, text, and/or data services over a proprietary interface and/or protocol.

In implementations described herein, server device 120 may establish a communication session with mobile device 110. Server device 120 may provide screen data to mobile device 110 for presentation to a user. Mobile device 110 may present on a display of the mobile device, images based on the screen data and receive user input via a user interface (e.g., touch panel, keypad, etc.). Mobile device 110 may convert the user input into input data packets corresponding to the user input. Server device 120 may receive the input data packets from mobile device 110 and may apply the user input to a virtual mobile device at server device 120. Server device 120 may execute commands based on the applied user input, and may send, to mobile device 110, updated screen data based on the executed commands.

In FIG. 1, the particular arrangement and number of components of network 100 are illustrated for simplicity. In practice there may be more mobile devices 110, server devices 120, wireless access networks 130, and/or public networks 140. For example, there may be thousands of mobile devices 110.

Figure 2:
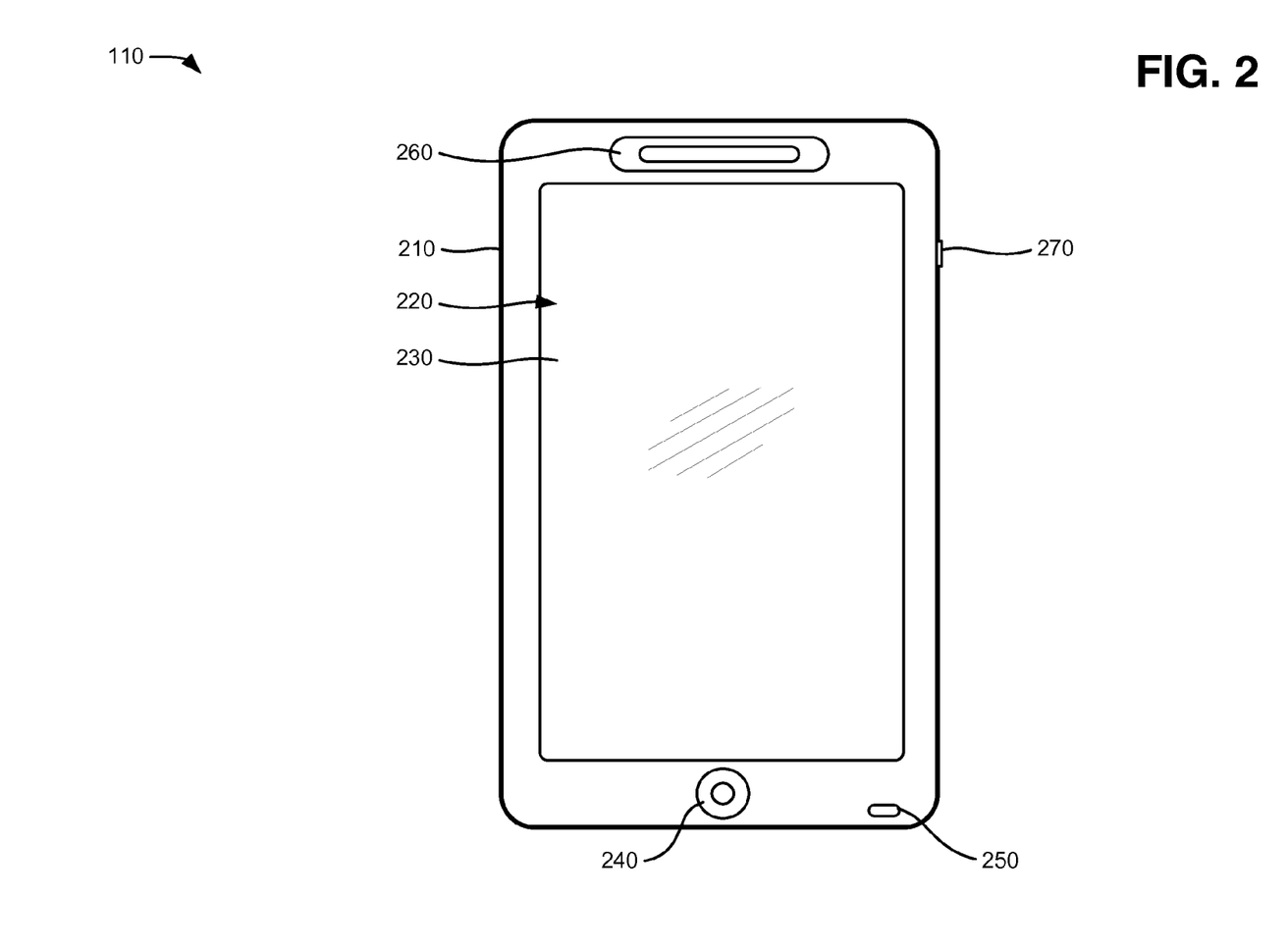
FIG. 2 is a diagram of exemplary components of one of the devices of the network of FIG. 1.

FIG. 2 is a diagram of an exemplary mobile device 110. Mobile device 110 may include a housing 210, a display 220, a touch panel 230, control buttons 240, a microphone 250, a speaker 260, and an audio port 270. Housing 210 may protect the components of mobile device 110 from outside elements. Housing 210 may include a structure configured to hold devices and components used in mobile device 110, and may be formed from a variety of materials. For example, housing 210 may be formed from plastic, metal, or a composite, and may be configured to support display 220, touch panel 230, control buttons 240, microphone 250, speaker 260 and/or audio port 270.

Display 220 may provide visual information to the user. For example, display 220 may display text input into mobile device 110, text, images, video, and/or graphics received from another device, and/or information regarding incoming or outgoing calls or text messages, emails, media, games, phone books, address books, the current time, etc. For example, display 220 may include a liquid crystal display (LCD), such as a thin film transistor (TFT) LCD, etc.

As shown in FIG. 2, touch panel 230 may be integrated with and/or overlaid on display 220 to form a touch screen or a panel-enabled display that may function as a user input interface. For example, in one implementation, touch panel 230 may include near field-sensitive (e.g., capacitive) technology, acoustically-sensitive (e.g., surface acoustic wave) technology, photo-sensitive (e.g., infra-red) technology, pressure-sensitive (e.g., resistive) technology, force-detection technology, and/or any other type of touch panel overlay that allows display 220 to be used as an input device. Generally, touch panel 230 may include any kind of technology that provides the ability to identify a touch and/or a sequence of touches that are registered on the surface of touch panel 230.

Control buttons 240 may permit the user to interact with mobile device 110 to cause mobile device 110 to perform one or more operations. For example, control buttons 240 may be used to cause mobile device 110 to transmit information, quit an application, and/or display a menu. In one implementation, one or more control buttons 240 may be used to activate/deactivate mobile device 110.

Microphone 250 may receive audible information from the user. For example, microphone 250 may receive audio signals from the user and may output electrical signals corresponding to the received audio signals. Speaker 260 may provide audible information to a user of mobile device 110. Speaker 260 may be located in an upper portion of mobile device 110, and may function as an ear piece when a user is engaged in a communication session using mobile device 110. Speaker 260 may also function as an output device for music and/or audio information associated with, for example, games and/or video images played on mobile device 110. Audio port 270 may include a port to receive a jack to, for example, divert sound from speaker 260 to an external earpiece or headphone set. In one implementation, audio port 270 or other input/output components for mobile device 110 may be implemented via a Bluetooth™ interface.

Although FIG. 2 shows exemplary components of mobile device 110, in other implementations, mobile device 110 may contain fewer, different, differently-arranged, or additional components than depicted in FIG. 2. For example, mobile device 110 may also include one or more cameras, an integrated or detachable keyboard, etc.

Figure 3:
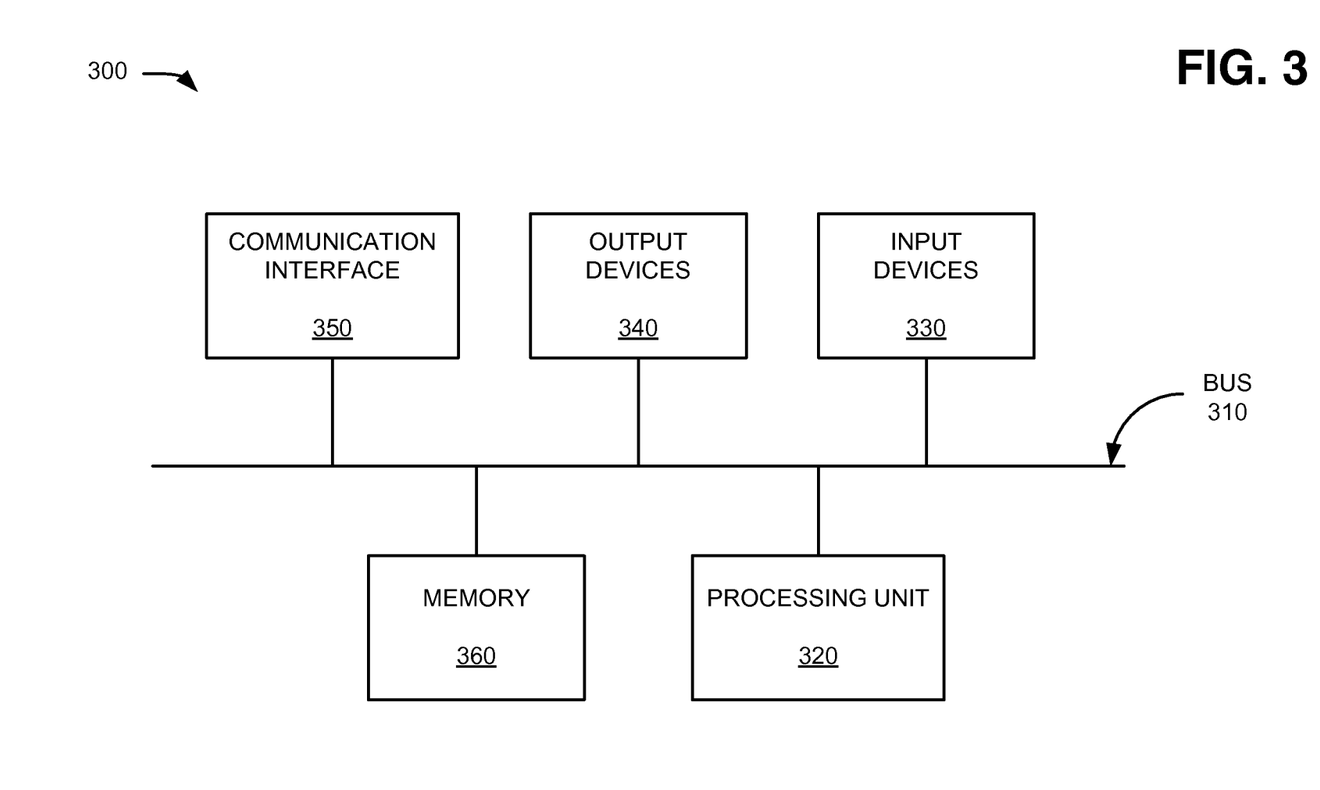
FIGS. 3 and 4 are diagrams of exemplary components of a mobile device of the network of FIG. 1.

FIG. 3 is a block diagram of exemplary components of mobile device 110 according to one implementation. Mobile device 110 may include a bus 310, processing unit 320, input devices 330, output devices 340, a communication interface 350, and a memory 360. Mobile device 110 may include other components (not shown) that aid in receiving, transmitting, and/or processing data. Moreover, other configurations of components in mobile device 110 are possible. Bus 310 may include a path that permits communication among the components of mobile device 110.

Processing unit 320 may include any type of processor or microprocessor (or groups of processors or microprocessors) that interprets and executes instructions. In one implementation, processing unit 320 may include one or more application-specific integrated circuits (ASICs), field-programmable gate arrays (FPGAs), or the like. In other implementations, processing unit 320 may include a CPU in combination with an ASIC, FPGA, etc. Processing unit 320 is described further below in connection with FIG. 4.

Input devices 330 may include devices that permit a user to input information into mobile device 110. Input devices 330 may include, for example, touch-panel 230, control button 240, microphone 250, an accelerometer, a keyboard, etc. Input devices 330 may be integrated with mobile device 110 or connected via a wireless (e.g., Bluetooth™) or physical interface.

Output devices 340 may include devices that output information to the user. Output devices 340 may include, for example, display 220, speaker 260, etc. In one implementation, output devices 340 may present to a user of mobile device 110 information received from server device 120. Output devices 340 may be integrated with mobile device 110 or connected via a wireless or physical interface.

Communication interface 350 may enable mobile device 110 to communicate with other devices and/or systems. Communication interface 350 may include a transmitter that may convert baseband signals to radio frequency (RF) signals and/or a receiver that may convert RF signals to baseband signals. Alternatively, communication interface 350 may include a transceiver to perform functions of both a transmitter and a receiver. Communication interface 350 may be coupled to an antenna for transmission and reception of the RF signals. Communications interface 350 may include a wireless network interface (e.g., UTCP, WiFi, LTE, or another broadband wireless interface) card for wireless communications. Communication interface 350 may also include, for example, a universal serial bus (USB) port for communications over a cable, a Bluetooth™ wireless interface for communicating with Bluetooth™ devices, a near-field communication (NFC) interface, etc. In one implementation, communication interface 350 may implement a wireless communication protocol, such as UTCP, LTE, GSM, CDMA, WCDMA, GPRS, EDGE, etc.

Memory 360 may include a dynamic random access memory (DRAM) or another type of dynamic storage device that may store information and instructions, such as video data for display 220. In other implementations, memory 360 may include a read-only memory (ROM) device or another type of static storage device that may store static information and instructions for use by portions of processing unit 320.

As described above, processing unit 320 may include one or more dedicated hardware components, such as an FPGA or an ASIC, to control other components of mobile device 110. For example, processing unit 320 may generally provide an interface, to receive/present data from server device 120, on mobile device 110 and to collect/send user input from mobile device 110 to server device 120.

Figure 4:
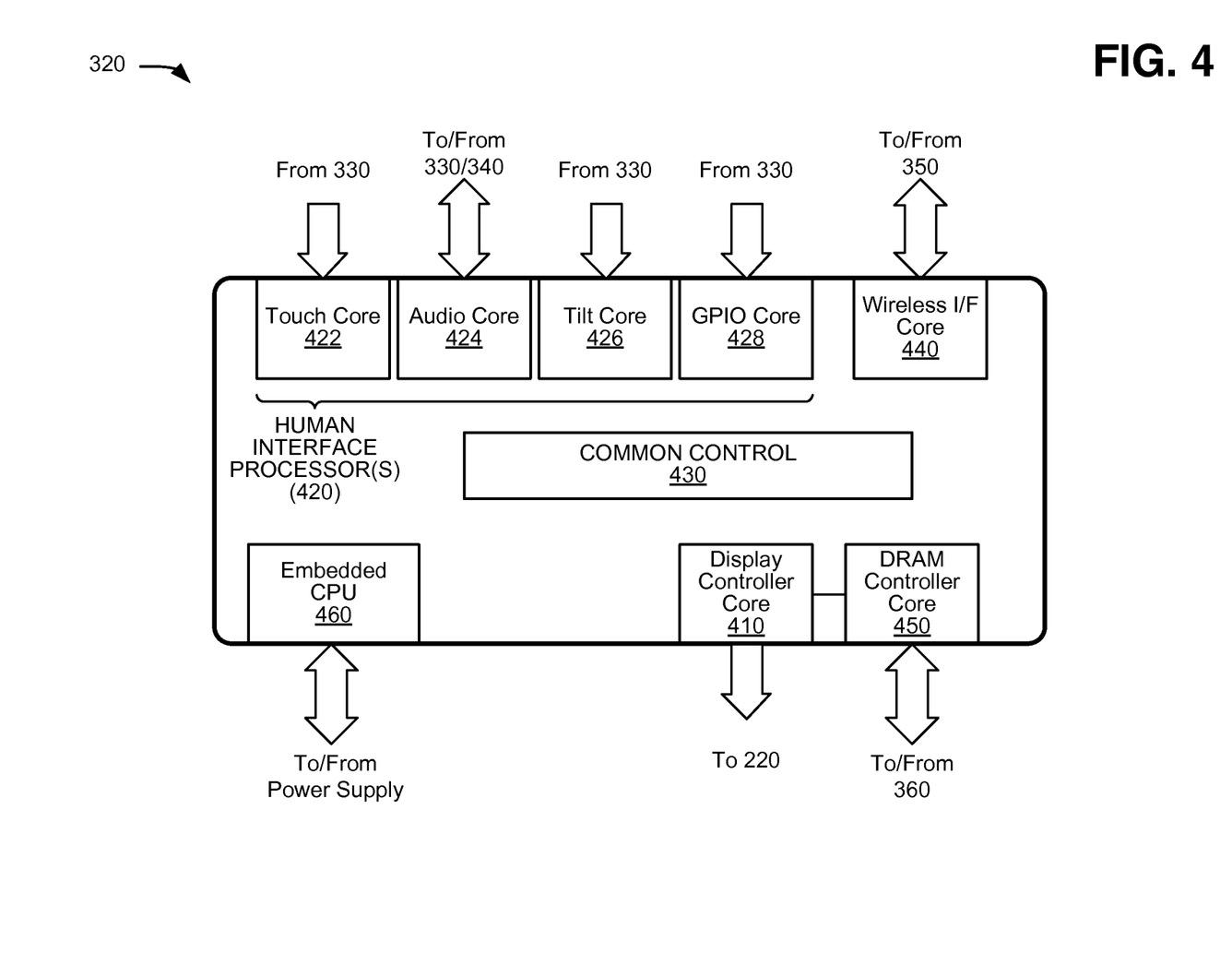

FIG. 4 illustrates exemplary components of processing unit 320 according to one implementation. As shown, processing unit 320 may include a display controller core 410, human interface processors 420, a common control module 430, a wireless interface (I/F) core 440, and a DRAM controller core 450. In some implementations, as also shown in FIG. 4, processing unit 320 may also include an embedded CPU 460.

Display controller core 410 may generate images for display 220 based on screen data. Screen data may be received, for example, from server device 120 (via communications interface 350 and wireless interface core 440) and may be stored in a dedicated display memory (e.g., memory 360). The display memory may be used to store and cycle through raster images. In one implementation, display controller core 410 may refresh display 220 at a rate of about 60 frames per second. In one implementation, display controller core 410 may implement a character or text mode that is on a plane separate from that of a graphics processing mode. In this way it is possible to switch between the graphics plane over to the text plane.

Human interface processors 420 may register human input into mobile device 110 and package the human input as data for forwarding to server device 120. Human input data may be registered from any input device 330 and may include, for example, touch screen input (e.g., particular touch panel coordinates and/or pressure readings on touch panel 230), audio input (e.g., registered from microphone 250), tilt data (e.g., from an accelerometer), and/or button input (e.g., from control buttons 240). In one implementation, human interface processors 420 may include a separate state machine for each type of human input available on mobile device 110. For example, human interface processor 420 may include touch core 422 to interface with touch panel 230, audio core 426 to interface with microphone 250, tilt core 426 to interface with an accelerometer/gyroscope, and general purpose input output core (GPIO) core 428 to process control button input 240 and/or keypad input. Human interface processors 420 may configure human input data into a streamlined format for communication with server device 120. For example, as described further herein, human interface processors 420 may process human input data into blocks of packets and may route the blocks of packets via User Datagram Protocol (UDP) to server device 120.

Common control module 430 may coordinate functions of display controller core 410, human interface processors 420, wireless interface core 440, and DRAM controller core 450. For example, common control module 430 may manage receipt, sequencing, and distribution of input data from human interface processors 420 and server device 120. Wireless interface core 440 may manage distribution to and receipt of packets from a broadband wireless communication interface (e.g., communications interface 350).

DRAM controller core 450 may be used to store and cycle through raster images used by display controller core for display 220. DRAM controller core 450 may read/write image data from server device 120 to memory 360 (e.g., a DRAM chip).

CPU core 460 may include a low-power CPU to provide supervisory functions for mobile device 110. For example, CPU core 460 may monitor battery levels, manage power consumption (e.g., dim or turn off LCD backlighting during non-use), configure wireless communication interfaces, and other supervisory functions. As described above, CPU core 460 is not responsible for any of the main functionalities of mobile device 110.

Although FIGS. 3 and 4 show exemplary internal components of mobile device 110, in other implementations, mobile device 110 may contain fewer, different, differently-arranged, or additional components than depicted in FIGS. 3 and 4. For example, in one implementation, processing unit 320 may include a configuration module, such as a Flash-based configuration device with a USB interface, to initially configure processing unit 320. Alternatively, or additionally, one or more components of mobile device 110 may perform one or more other tasks described as being performed by one or more other components of mobile device 110.

Figure 5:
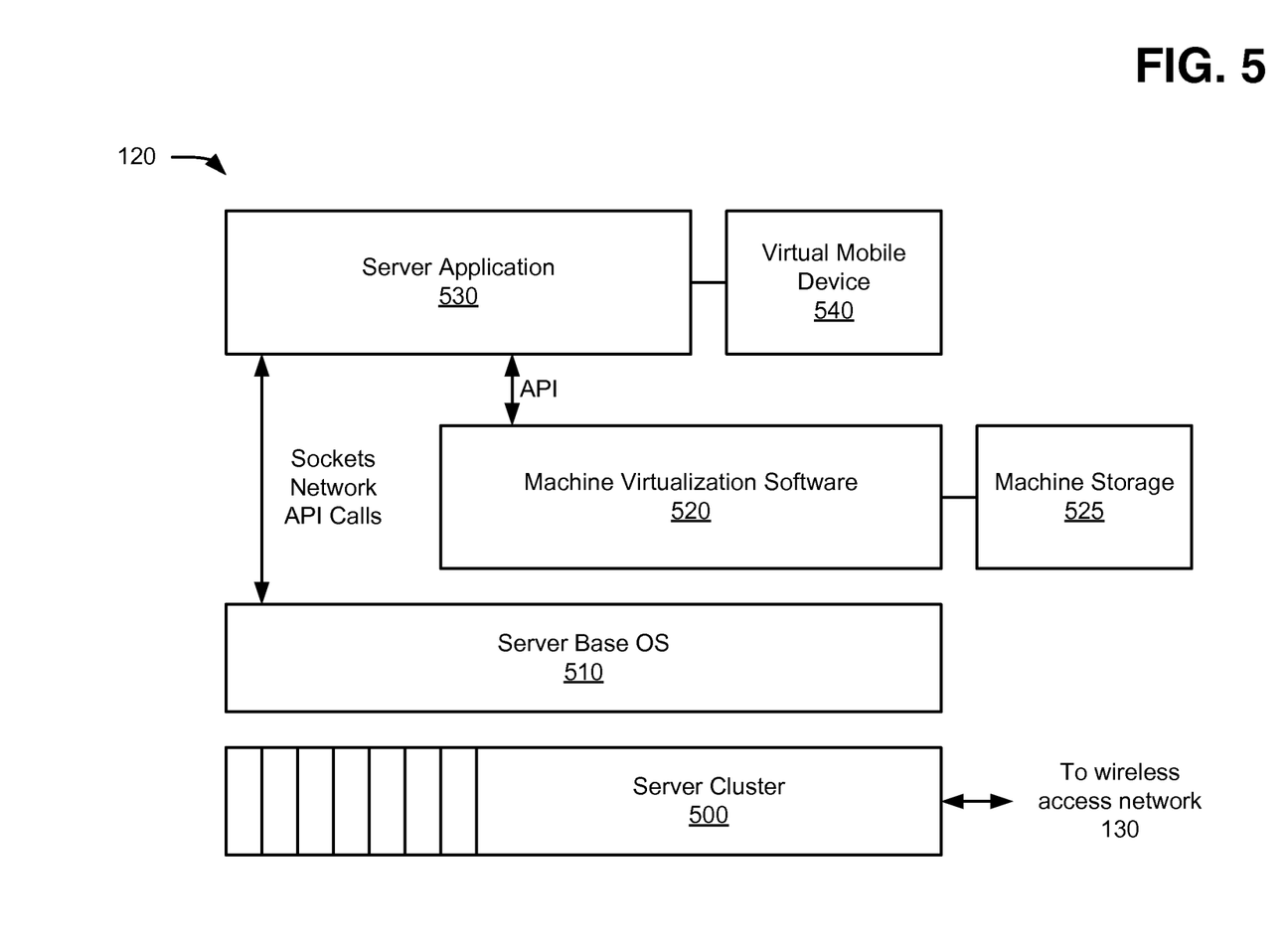
FIG. 5 is a diagram of exemplary components of a server device of the network of FIG. 1.

FIG. 5 is a diagram of exemplary components of server device 120. Server device 120 may be included, for example, in a server cluster 500 or another distributed computing environment. Each server device 120 in server cluster 500 may include a server base operating system (OS) 510, machine virtualization software 520, machine storage 525, server application 530, and virtual mobile device 540.

Server base operating system (OS) 510 may perform various support functions for components of server device 120. For example, server base OS 510 may provide interfaces between applications (e.g., server application 530) and other components (e.g., communication interfaces, etc.). In another example, server base OS 510 may provide a TCP/IP stack to support communication applications. In addition, server base OS may provide other functions, such as thread management, memory management, storage management, etc.

Machine virtualization software 520 may designate a portion of server device 120 resources for use by a mobile device 110 during a particular session. Machine virtualization software 520 may access platform data/programs, such as operating systems for running particular software applications, from dedicated machine storage 525.

Server application 530 may include an application being executed, on server device 120, for a user of mobile device 110. Server application 530 may include, for example, computer software designed to help a user perform one or more specific tasks. Generally, server application 530 may apply user input or device data received from mobile device 110 to execute instructions.

Virtual mobile device 540 may act out commands input by the user of mobile device 110. Virtual mobile device 540 may generally simulate presentation of server application 530 on mobile device 110. Virtual mobile device 540 may include, for example, a virtual display screen, a touch/button buffer, and a handset manager. The virtual display screen may replicate the screen presentation that will be produced on display 220 of mobile device 110. The touch/button buffer may receive and store user input from mobile device 110 (e.g., coordinates from touch panel 230, keyboard or control button 240 inputs, etc.). A handset manager may apply the user input from the touch/button buffer to a virtual display screen (e.g., to associate a touch location or button input with information presented on the virtual display screen 220).

Although FIG. 5 shows exemplary components of server device 120, in other implementations, server device 120 may contain fewer, different, differently-arranged, or additional components than depicted in FIG. 5. Alternatively, or additionally, one or more components of server device 120 may perform one or more other tasks described as being performed by one or more other components of server device 120.

Figure 6A:
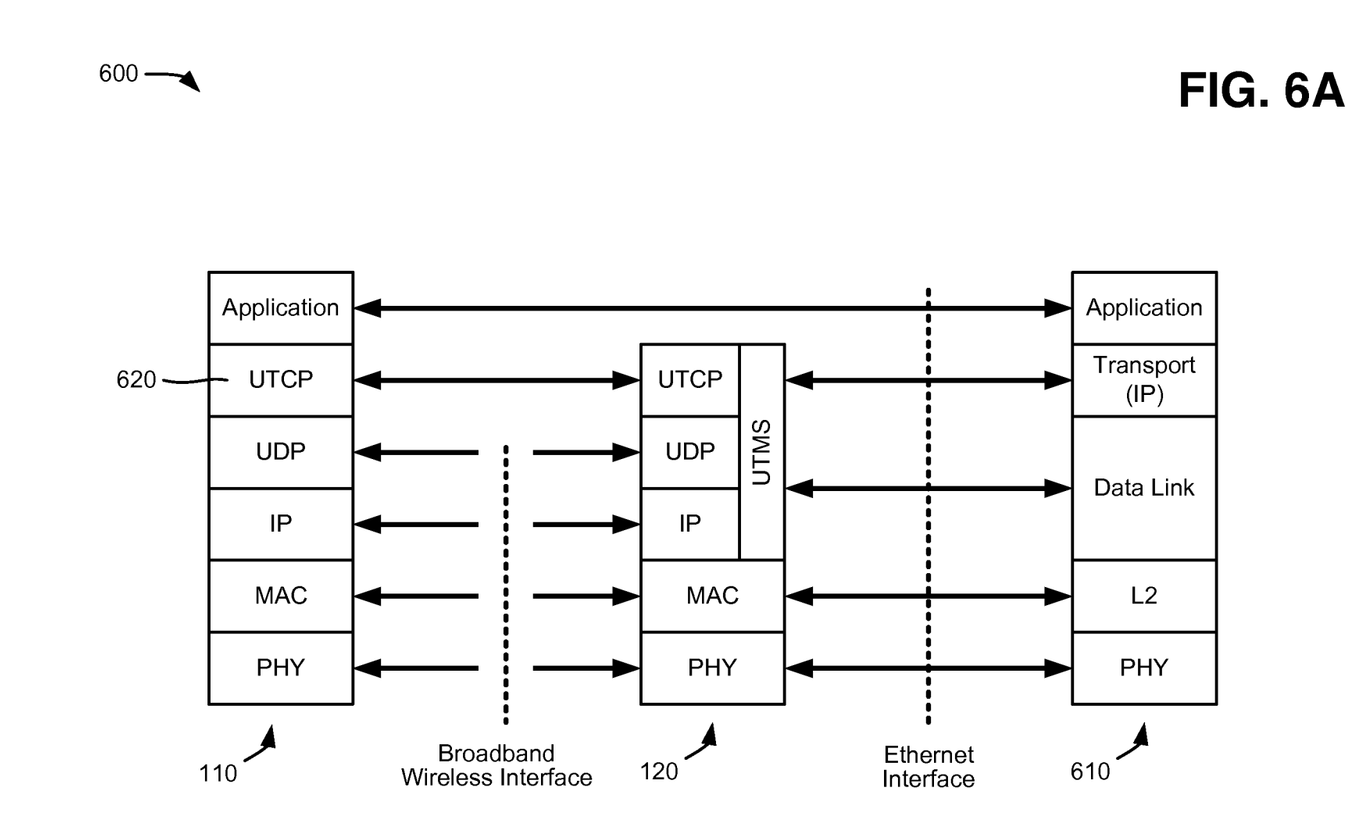
FIG. 6A provides an illustration of an Ultra-Thin Client Protocol (UTCP) stack according to an implementation described herein.

FIG. 6A provides an illustration of an Ultra Thin Client Protocol (UTCP) stack according to an implementation described herein. In implementations described herein, UTCP may be a lightweight protocol implemented completely in hardware. Server device 120 may provide the upper layer interface to an Internet service device 610. The server device 120 may utilize machine virtualization to provide mobile device 110 with a virtual machine assigned to a session. Once established, the session between server device 120 and mobile device 110 may be facilitated using UTCP 620 which rides on top of UDP/IP. TCP is not used in this case since UTCP 620 provides its own error detection and correction as well as congestion control that is optimized specifically for communications between mobile device 110 and server device 120.

Figure 6B:
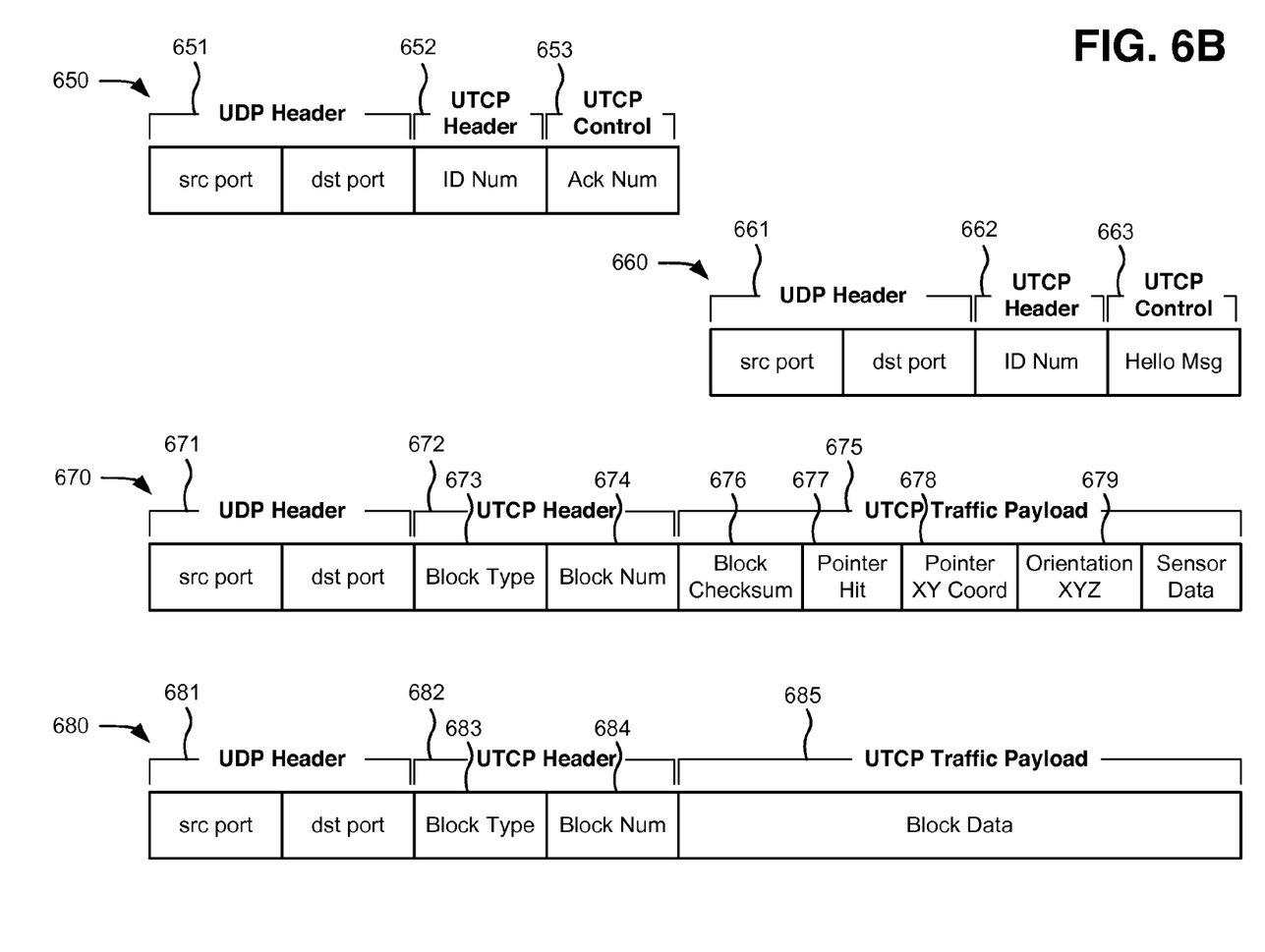
FIG. 6B provides an illustration of exemplary UTCP packet structures according to an implementation described herein.

FIG. 6B provides an illustration of UTCP packet structures according to an implementation described herein. As shown in FIG. 6B, there may be two categories or types of packets: control plane packets 650/660 and traffic plane packets 670/680. Each type of packet 650/660 and 670/680 may be customized for the direction of communications. More particularly, control plane packet 650 represents an upstream control plane packet from mobile device 110 to server device 120; while control plane packet 660 represents a downstream control plane packet from server device 120 to mobile device 110. Traffic plane packet 670 represents an upstream traffic plane packet from mobile device 110 to server device 120; while traffic plane packet 680 represents a downstream traffic plane packet from server device 120 to mobile device 110.

Control plane packet 650 may include a UDP header section 651 that includes a source port (e.g., from mobile device 110) section and a destination port (e.g., at server device 120) section, a UTCP header section 652, and a UTCP control field 653. UTCP header field 652 may include an identification (ID number) of mobile device 110. UTCP control field 653 may include a unique acknowledgement (Ack) number.

Control plane packet 660 may include a UDP header section 661 that includes a source port (e.g., from server device 120) section and a destination port (e.g., at mobile device 110) section, a UTCP header field 662, and a UTCP control field 663. UTCP header field 662 may include an identification (ID number) of base station 135 (e.g., associated with server device 120). UTCP control field 653 may include a "hello" message indicating base station 135 is available to enter into a session with mobile device 110.

Traffic plane packet 670 may include may include a UDP header section 671 that includes a source port (e.g., from mobile device 110) section and a destination port (e.g., at server device 120) section; a UTCP header section 672 that includes a block type 673 and a block number 674; and a UTCP traffic payload section 675 that includes a block checksum 676, a pointer hit 677, a pointer XY coordinate 678, an orientation XYZ coordinate 679, or sensor data. The source port and destination port in UDP header section 671 for traffic plane packets may be different than the source port and destination port in UDP header section 651 for control plane packets. Block type 673 may include a type indication (e.g., image, sound, etc.) for the packets in the block. Block number 674 may include an identification and/or sequence number for block with which packet 670 is associated. UTCP traffic payload section 675 may include human input data detected by mobile device 120. Human input data may vary depending, for example, on the type of block indicated by block type 673. For example human input data may include audio input or physical input. Block checksum 676 may include a checksum value for a block of packets, as calculated by a particular checksum function. If UTCP traffic payload section 675 includes physical input, any of pointer hit 677 (e.g., indicating a tap on touch panel 230), pointer XY coordinates 678 (e.g., a touch location on touch panel 230), orientation XYZ coordinate 679 (e.g., tilt of mobile device 110), and/or the sensor data may include data from physical user input from mobile device 110. If UTCP traffic payload section 675 includes audio input, sound data may replace one or more of pointer hit 677, pointer XY coordinates 678, orientation XYZ coordinate 679, and/or the sensor data.

Traffic plane packet 680 may include a UDP header section 681 that includes a source port (e.g., from server device 120) section and a destination port (e.g., at mobile device 110) section; a UTCP header section 682 that includes a block type 683 and a block number 684; and a UTCP traffic payload section 685. Block type 683 may include a type (e.g., image, sound, etc.) indication for the packet. Block number 684 may include an identification and/or sequence number for block with which packet 680 is associated. UTCP traffic payload section 685 may include information for presentation by mobile device 120. The presentation information may include, for example, screen raster data for presentation on display 220 or audio data for output through speaker 260.

Figure 7:
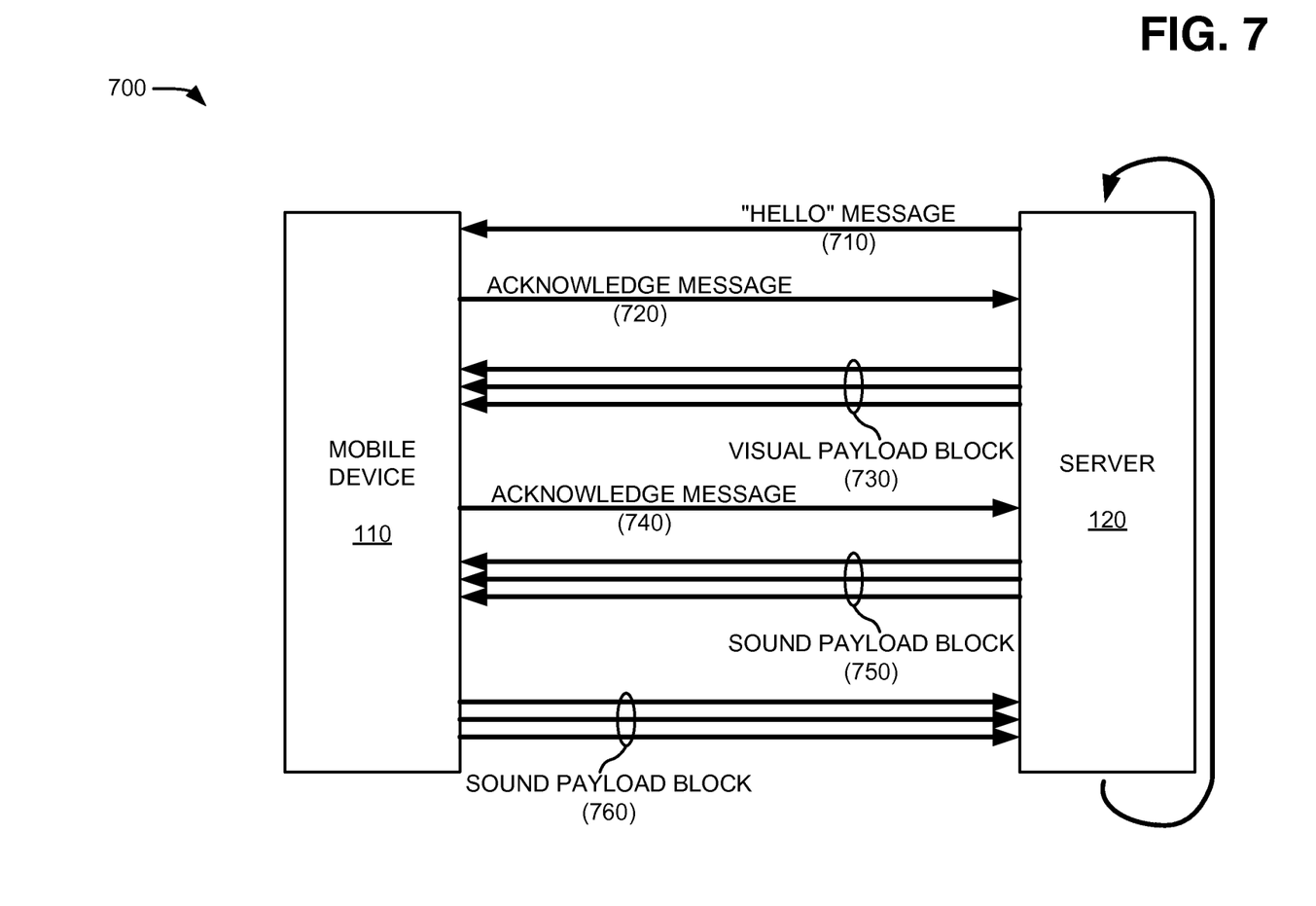
FIG. 7 is a diagram of exemplary communications between a user device and server device according to an implementation described herein.

FIG. 7 depicts a diagram of representative communications among components of a portion 700 of network 100 using UTCP. As shown in FIG. 7, network portion 700 may include mobile device 110 and server device 120. In performing communications shown in FIG. 7, mobile device 110 and server device 120 may utilize the packet structures described above in connection with FIG. 6B.

Server device 120 may provide a "hello message" 710. Hello message 710 may be included for example, within control plane packet 660. Hello message 710 may function as a beacon message that is continuously sent out by base station 135 at a predetermined interval (e.g., approximately every 2 seconds). Hello message 710 may always be the same and may uniquely identify base station 135 associated with server device 120.

A mobile device 110 (e.g., that enters into the coverage area of the base station 135 and is interested in establishing a session) may respond to hello message 710 with an acknowledge message 720. Acknowledge message 720 may be included for example, within control plane packet 650. Acknowledge message 720 may let server device 120 know that mobile device 110 is interested in establishing a session and may identify mobile device 110 for verification. Assuming the device identifier in acknowledge message 720 is valid, server device 120 may establish a session with mobile device 110.

Once the session is established, the server device 120 may begin sending payload block messages, such as visual payload block messages 730 or sound payload block messages 750, in between hello messages 710. The first of the payload block messages may serve as an acknowledgement to the session request (e.g., acknowledge message 720) from mobile device 110. Visual payload block messages 730 and sound payload block messages 750 may include, for example, multiple UDP packets (e.g., traffic plane packets 680). In one implementation, the acknowledgement in the first of the payload block messages may be indicated by a single bit in block data 685. Visual payload block messages 730 and sound payload block messages 750 may be delivered asynchronously. Visual payload block messages 730 may include screen raster data for presentation on display 220. For example, visual payload block messages may include menu items, backgrounds, icons, and/or application-specific visual presentations. Sound payload block messages 750 may include audio signals, such a voice signals, streaming media signals, etc.

Mobile device 110 may receive payload blocks (e.g., visual payload block messages 730 and sound payload block messages 750) from server device 120. Mobile device 110 may decode the payload blocks and place them into an appropriate presentation buffer (e.g., memory 360). At the same time, asynchronously, mobile device 110 may send back visual payload acknowledge message 740. For example, mobile device 110 may continuously scan the presentation buffers responding with block check sequence codes (e.g., block checksum 676). Visual payload acknowledge message 740 may not be specifically tied to any particular payload block from server device 120. Instead, acknowledge message 740 may include an error check sequence code relative to each payload buffer in mobile device 110. Visual payload acknowledge message 740 may also include touch coordinates, button input, or other user input from mobile device 110. Visual payload acknowledge message 740 may include, for example, multiple UDP packets (e.g., traffic plane packets 670).

Mobile device 110 may provide sound payload block messages 760 to server device 120. Sound payload block messages 760 may include multiple UDP packets with audio signals, such as voice signals, from a user of mobile device 120. Sound payload block messages 760 may include multiple UDP packets with sound blocks plus acknowledge messages for previous sound blocks (e.g., sound payload block messages 750) from server device 120.

Whenever a block sequence code in the presentation buffer of mobile device 110 (as included in block checksum 676) fails to match the code of the virtual machine buffer of server device 120 (e.g., virtual mobile device 540), server device 120 may respond by sending the corresponding payload buffer to refresh the presentation buffer of mobile device 110. This refreshing may be done asynchronously with respect to performing checksums and acknowledgements. Performing the block checking asynchronously reduces the overhead processing on the part of mobile device 110 and speeds the overall presentation response time by decoupling the check processing from time-aligned packet processing.

Figure 8:
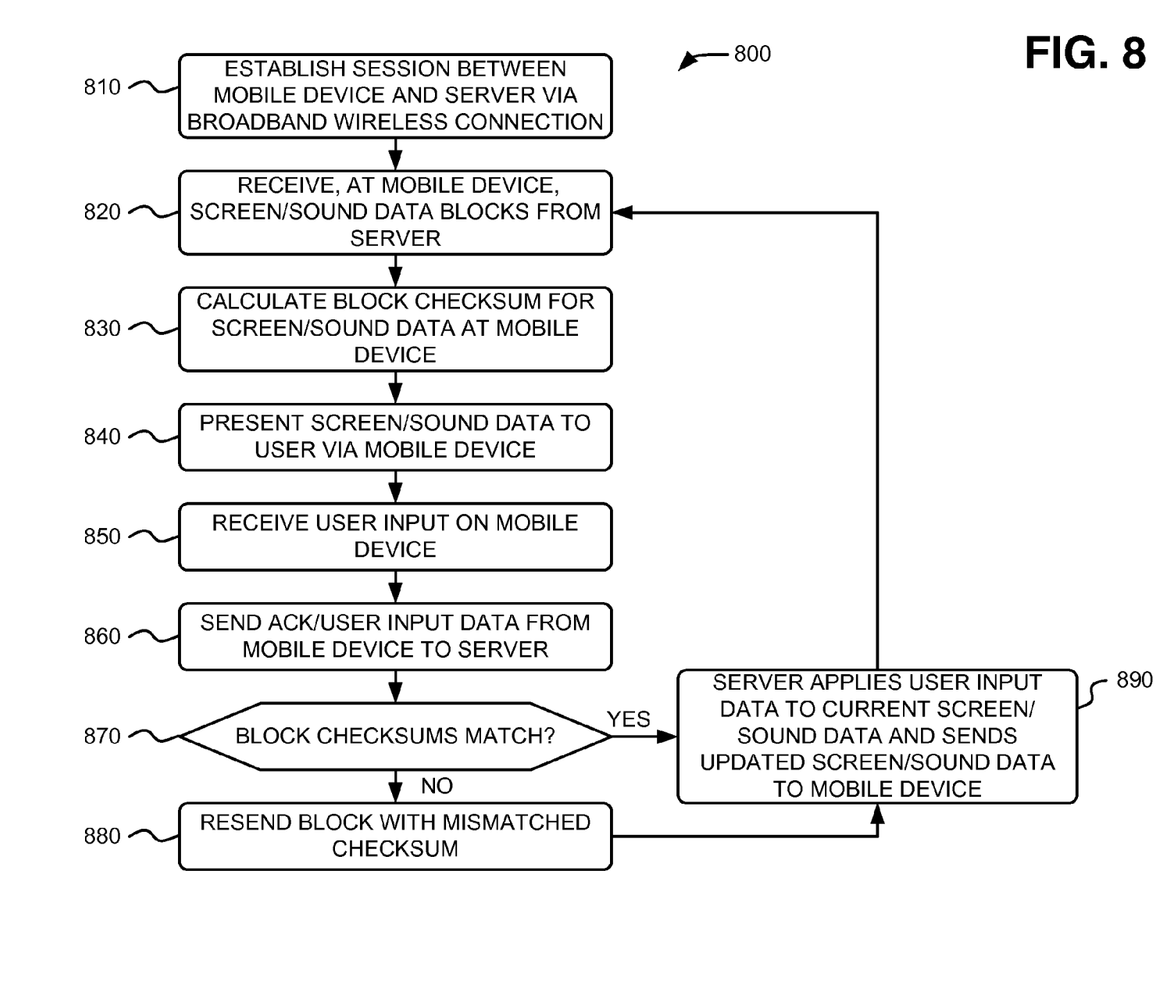
FIG. 8 is a flow chart of an exemplary process for performing operations with mobile device according to an implementation described herein.

FIG. 8 is a flow chart of an exemplary process for performing operations with an ultra-thin mobile client according to an implementation described herein. In one implementation, process 800 may be performed by mobile device 110. In another implementation, some or all of process 800 may be performed by another device or group of devices, including or excluding mobile device 110.

As shown in FIG. 8, process 800 may include establishing a session between a mobile device and a server via a broadband wireless connection (block 810) and receiving, at the mobile device, screen and/or sound data from the server (block 820). For example, in response to a hello message 710 from base station 135, mobile device 110 may send an acknowledge message 720 to server device 120. Acknowledge message 720 may establish a session between mobile device 110 and server device 120. Server device 120 may provide a session acknowledgement indication along with visual payload block 730 and/or sound payload block 750. Visual payload block 730 and sound payload block 750 may include information that may be presented to a user of mobile device 110.

Process 800 may include calculating a block checksum for the screen/sound data at the mobile device (block 830) and presenting the screen/sound data to a user via the mobile device (block 840). For example, mobile device 110 may apply a checksum function to calculate a checksum for each block of visual payload block 730 and sound payload block 750. Mobile device 110 may also apply data from visual payload block 730 and sound payload block 750 to appropriate buffers for presentation to a user.

Process 800 may further include receiving user input on the mobile device (block 850), and sending acknowledgements and/or user input data from the mobile device to the server (block 860). For example, mobile device 110 may receive user input (e.g., a touch on touch panel 230, a press on button 240, audio input into microphone 250, a tilt, etc.) and generate one or more messages or message blocks (e.g., traffic plane packets 670) including the user input data and the previously calculated checksum (e.g., block checksum 676). Mobile device 110 may send the user input data and checksum to server device 120 as acknowledge message 740.

Process 800 may include determining if checksums match (block 870). For example, server device 120 may receive acknowledge message 740 and, if a checksum is included, server device 120 may compare the included checksum value (e.g., block checksum 676) to a previously-calculated checksum for the corresponding payload block.

If the checksums do not match (block 870—NO), process 800 may include resending blocks with the mismatched checksums (block 880). For example, if server device 120 determines that the checksum value (e.g., block checksum 676) from mobile device 110 does not match the checksum value calculated by server device 120 for a particular payload block, server device 120 may resend the particular payload block (e.g., one of visual payload blocks 730 or sound payload blocks 750) to mobile device 110.

If the checksums match (block 870—YES), or if blocks are resent (block 880), process 800 may include applying the user input data to current screen/sound data and sending updated screen/sound data blocks to the mobile device (block 890). For example, server device 120 may apply the user input from mobile device 110 (e.g., touch panel data, button data, audio input data, tilt data, etc.) to a corresponding virtual screen image to determine the context of the user input. Server device 120 may apply the user input, for example, to the appropriate screen image and generate updated screen data and/or sound data in response to the user input. The updated screen data and/or sound data may be provided to mobile device 110 as visual payload block 730 and sound payload block 750.

In systems and/or methods described herein, a mobile device may initiate a wireless session with a remote server and may receive screen data from the server that represents an application being executed by a virtual mobile device program on the server. The mobile device may present images based on the screen data and may receive, from an interface component of the mobile device, user input. The mobile device may send, to the server, a user data message corresponding to the user input. The mobile device may receive, from the server, updated screen data based on applying the user data message on the application being executed by the virtual mobile device program on the server and may present images based on the updated screen data.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A mobile device, comprising:
   a communication interface configured to:
   receive, over a wireless communication link, output data from a server device via a wireless network, and
   send, over the wireless communication link, input data to the server device via the wireless network;
   a display for displaying a first portion of the output data;
   a speaker for providing sounds corresponding to a second portion of the output data;
   a human interface component for receiving the input data; and
   a hardware component including multiple coordinated sequential machines for:
   generating images for the display based on the first portion of the output data,
   providing the second portion of the output data to the speaker,
   collecting the input data from the human interface component, and
   providing the input data to the server device via the communication interface,
   wherein when providing the input data, the mobile device uses a lightweight client protocol, implemented in the hardware component without an operating system or software, on top of User Datagram Protocol (UDP).

2. The mobile device of claim 1, wherein the hardware component includes one of:
   a field programmable gate array (FPGA), or
   an application-specific integrated circuit (ASIC).

3. The mobile device of claim 1, wherein the human interface component includes a touch panel.

4. The mobile device of claim 3, wherein the human interface component further includes:
   a microphone,
   an accelerometer, or
   a button.

5. The mobile device of claim 3, wherein the human interface component further includes a camera.

6. The mobile device of claim 3, wherein the touch panel is overlaid on the display.

7. The mobile device of claim 1, further comprising:
   a dynamic random access memory (DRAM), wherein the DRAM buffers the first portion of the output data.

8. The mobile device of claim 1, further comprising:
   a central processing unit, embedded in the hardware component, that performs supervisory functions for the mobile device.

9. The mobile device of claim 1, wherein the communication interface supports a broadband wireless protocol.

10. A method, comprising:
    initiating, by a mobile device, a wireless session with a remote server;
    receiving, by a first one of multiple sequential machines within a hardware component of the mobile device, screen data from the server that represents an application being executed by a virtual mobile device program on the server;
    presenting, on the display of the mobile device, images based on the screen data;
    receiving, from an interface component of the mobile device, user input;
    generating, by a second one of the multiple sequential machines within the hardware component of the mobile device, a user data message corresponding to the user input;
    sending, to the server, the user data message corresponding to the user input, wherein when sending the user data message, the mobile device uses a lightweight client protocol, implemented in the hardware component without an operating system or software, on top of User Datagram Protocol (UDP);
    receiving, by the first one of multiple sequential machines and from the server, updated screen data based on applying the user data message by the application being executed by the virtual mobile device program on the server; and
    presenting, on the display of the mobile device, images based on the updated screen data.

11. The method of claim 10, wherein initiating the wireless session includes:
   receiving, by a mobile device, a hello message associated with the server; and
   sending, by the mobile device and based on the hello message, an acknowledgement message to the server.

12. The method of claim 10, further comprising:
   calculating, by the mobile device, a checksum for the screen data received from the server, wherein the calculated checksum is included in the user data message.

13. The method of claim 10, wherein the presenting images based on the screen data, the sending the user data message corresponding to the user input, and the presenting images based on the updated screen data are performed by one or more of the multiple sequential machines within the hardware component.

14. The method of claim 10, wherein sending the user data message corresponding to the user input and receiving updated screen data based on the user data message are performed asynchronously.

15. The method of claim 10, further comprising:
   storing, in a dynamic random access memory (DRAM), the screen data and the updated screen data.

16. A system comprising:
   a server device, including:
   a communication interface for receiving, via a wireless network, input from a remote mobile device,
   an interface for providing the input to a virtual mobile device running on the server device; and
   the virtual mobile device comprising:
   an application running on the virtual mobile device configured to:
   receive the input via the interface,
   process the input,
   generate an output based on the processing, and
   provide the output to the interface;
   wherein the interface is further configured to send the output to the remote mobile device via the communication interface; and
   the remote mobile device including:
   a hardware component to:
   present, on a display of the remote mobile device, images based on the screen data
   receive, from a human interface component of the remote mobile device, input data, and
   send, to the server device, a user data message including the input data, wherein, when sending the user data message, the hardware component uses a lightweight client protocol, implemented in the hardware component without an operating system or software, on top of User Datagram Protocol (UDP).

17. The system of claim 16, wherein, when sending the output to the remote mobile device via the communication interface, the server device is further configured to:
   provide a block of multiple packets using User Datagram Protocol (UDP),
   calculate a local checksum for the block, and
   verify a remote checksum from the mobile device with the local checksum.

18. The system of claim 17, wherein the hardware component is further configured to:
   receive the block of multiple packets, and
   calculate the remote checksum for the block; and
   wherein, when sending the user data message, the hardware component further includes the remote checksum in the user data message.

* * * * *